(12) United States Patent
Sadowara

(10) Patent No.: US 7,483,173 B2
(45) Date of Patent: Jan. 27, 2009

(54) DATA PROCESSOR HAVING A SYNCHRONIZING FUNCTION OF A PLURALITY OF CHIPS

(75) Inventor: Tetsuya Sadowara, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 713 days.

(21) Appl. No.: 11/076,160

(22) Filed: Mar. 10, 2005

(65) Prior Publication Data

US 2006/0203266 A1 Sep. 14, 2006

(51) Int. Cl.
*G06F 15/00* (2006.01)
*G06K 1/00* (2006.01)
*G06K 15/00* (2006.01)
*H04N 1/60* (2006.01)
*G03F 3/08* (2006.01)
*H04L 12/28* (2006.01)
*H04L 12/56* (2006.01)
*G11C 7/00* (2006.01)
*G11C 7/22* (2006.01)
*G11C 7/10* (2006.01)

(52) U.S. Cl. .............. 358/1.9; 358/1.16; 358/518; 358/523; 370/395.7; 365/189.011; 365/189.05

(58) Field of Classification Search .............. 358/1.9, 358/518, 1.16, 443, 444, 523; 370/395.7; 365/189.011, 189.05
See application file for complete search history.

(56) References Cited

U.S. PATENT DOCUMENTS

| 5,703,793 | A | * | 12/1997 | Wise et al. .............. 382/232 |
| 5,844,689 | A | * | 12/1998 | Kawase .............. 358/296 |
| 6,279,077 | B1 | * | 8/2001 | Nasserbakht et al. ........ 711/118 |
| 2006/0002399 | A1 | * | 1/2006 | Muta .............. 370/395.7 |

FOREIGN PATENT DOCUMENTS

JP 2000-322150 A 11/2000

* cited by examiner

*Primary Examiner*—Mark K Zimmerman
*Assistant Examiner*—Fan Zhang
(74) *Attorney, Agent, or Firm*—Foley & Lardner LLP

(57) ABSTRACT

A ring buffer is provided in the data holding section A3 of a data processing section 100A. A master-slave relationship between a plurality of data processing sections 100A, 100B is set. A data output synchronizing signal of the data processing section 100A acting as a master is supplied to the data processing section 100B acting as a slave. This makes it possible to synchronize the output data of the individual data processing sections, while suppressing the memory cost. Input connection terminals (A1) take in object data, an object data enable signal (INHDEN) from the outside, and an object read clock (IMCLK) from the outside. A data holding section (A3) stores object data on the basis of an internal clock. A synchronizing circuit (A4) reads the stored object data on the basis of INHDEN and IMCLK. An output connection terminal (A2) outputs output object data, INHDEN, and an internal clock equivalent to IMCLK to the outside.

9 Claims, 7 Drawing Sheets

DATA PROCESSOR HAVING A SYNCHRONIZING FUNCTION OF A PLURALITY OF CHIPS

BACKGROUND OF THE INVENTION

1. Field of the Invention

This invention relates to a data processor with the function of synchronizing a plurality of chips. The invention, which is applied to, for example, a color digital complex machine, is useful as an application specific integrated circuit (ASIC) used in configuring an image forming apparatus with the function of putting the phases of the image data outputs of a plurality of colors in phase, for example, an image processing integrated circuit (ASIC).

2. Description of the Related Art

A color digital complex machine has a read unit for reading a document. The output of the read unit is treated as R (red), G (green), and B (blue) image data at the image processing section. These RGB image data are synchronized with one transfer clock. The RGB image data are subjected to image processing as needed and are eventually converted into C (cyan), M (magenta), Y (yellow), and K (black) image data, which are then sent to the print section. According to the CMYK image data, the print section controls the printer driver, thereby printing out color images.

In such an image processing section, when RGB image data or CMYK image data are subjected to image processing, the image data of the individual colors synchronize with the same clock, as long as they are processed in one IC. Even when the individual colors are allocated to separate ICs, the image data of the individual colors synchronize with the same clock, as long as the ICs of the individual colors synchronize with the same external clock.

In recent years, however, image processing has been complicated because of an increase in the picture quality. As a result, in the RGB image data processing section or YMCK image data processing section, the size of the image processing block of each color tends to become enlarged. In addition, when image data of three colors of RGB or image data of four colors of YMCK are processed, only one image processing ASIC sometimes cannot include all of the necessary circuits for the processing. As a result, the image data have to be divided into pieces of image data to be processed on a one-color basis or a two-color basis and then independent image processing ASICs have to be provided so as to correspond to the divided pieces of image data.

Furthermore, the image processing sections have been strongly requested not only to produce higher-quality pictures but also to operate at higher speed. To increase the processing speed, each of the image processing ASICs has been requested to use a PLL (Phase Locked Loop) oscillator in it, thereby making the internal operation clock faster.

With the recent requests for higher-quality pictures and higher speed, the image processing ASICs may be divided on a color basis and further each of the image processing ASICs may use a PLL oscillator in it.

However, there are variations in time in the image processing ASIC of each color until the PLL oscillator supplies a stable clock to the image processing ASIC. Thus, the internal operation clocks can be desynchronized with one another color by color.

In such a case, since the image data of the individual colors output to the processing section at a subsequent stage are asynchronous with one another, they have to be synchronized with one another again when image processing is performed using a plurality of colors at the processing section at a subsequent stage.

If the processing section at a subsequent stage has the function of synchronizing the individual color image data, there is no problem. However, it does not have the synchronizing function, the individual image data are desynchronized with one another at the processing section at a subsequent stage, with the result that image processing cannot be performed.

Furthermore, the image data of each color is stored temporarily in such a memory as a page memory and the data of each color is read out in synchronization with one clock, which enables the image data of a plurality of colors to be output in synchronization with one clock. To achieve this, a memory must be added, resulting in an increase in the cost. These problems are encountered not only in the RGB images read by the read unit but also in a case where the RGB/YMCK image data are output by external image data output means to the color digital complex machine.

BRIEF SUMMARY OF THE INVENTION

An object of the embodiments is to provide a ring buffer in the data processing section. A master-slave relationship between a plurality of data processing units is set. The data output synchronizing signal of the data processing section acting as a master is supplied to the data processing section acting as a slave. This enables the memory cost to be suppressed and the output data of the individual processing sections to be synchronized.

Another object of the embodiments is to provide a ring buffer in an image processing integrated circuit (ASIC). One of a plurality of image processing integrated circuits (ASICs) having PLL circuits is set as a master and the rest as slaves. The data read synchronizing signal of the image processing integrated circuit (ASIC) of the master is supplied to the image processing sections of the slaves. This enables the memory cost to be suppressed and the output data of the individual image processing sections (ASICs) to be synchronized.

To achieve the foregoing objects, a data processor according to an embodiment of the present invention comprises a first data processing section which includes input connection terminals (A1) which take in object data, an object data enable signal (INHDEN) from the outside, and an object read clock (IMCLK) from the outside, a data holding section (A3) in which the object data is stored on the basis of an internal clock, a synchronizing circuit (A4) which reads the object data stored in the data holding section (A3) on the basis of the object data enable signal (INHDEN) from the outside and the object read clock (IMCLK) from the outside, and output connection terminals (A2) which output to the outside the output object data from the data holding section, the object data enable signal (INHDEN) from the outside, and an internal clock equivalent to the object read clock (IMCLK).

The basic configuration makes it easy to use one of the data processing sections as a master and the rest as slaves. Furthermore, the output data of the data processing sections can be output in synchronization with one another.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, an embodiment of the present invention will be explained.

Figure 1:
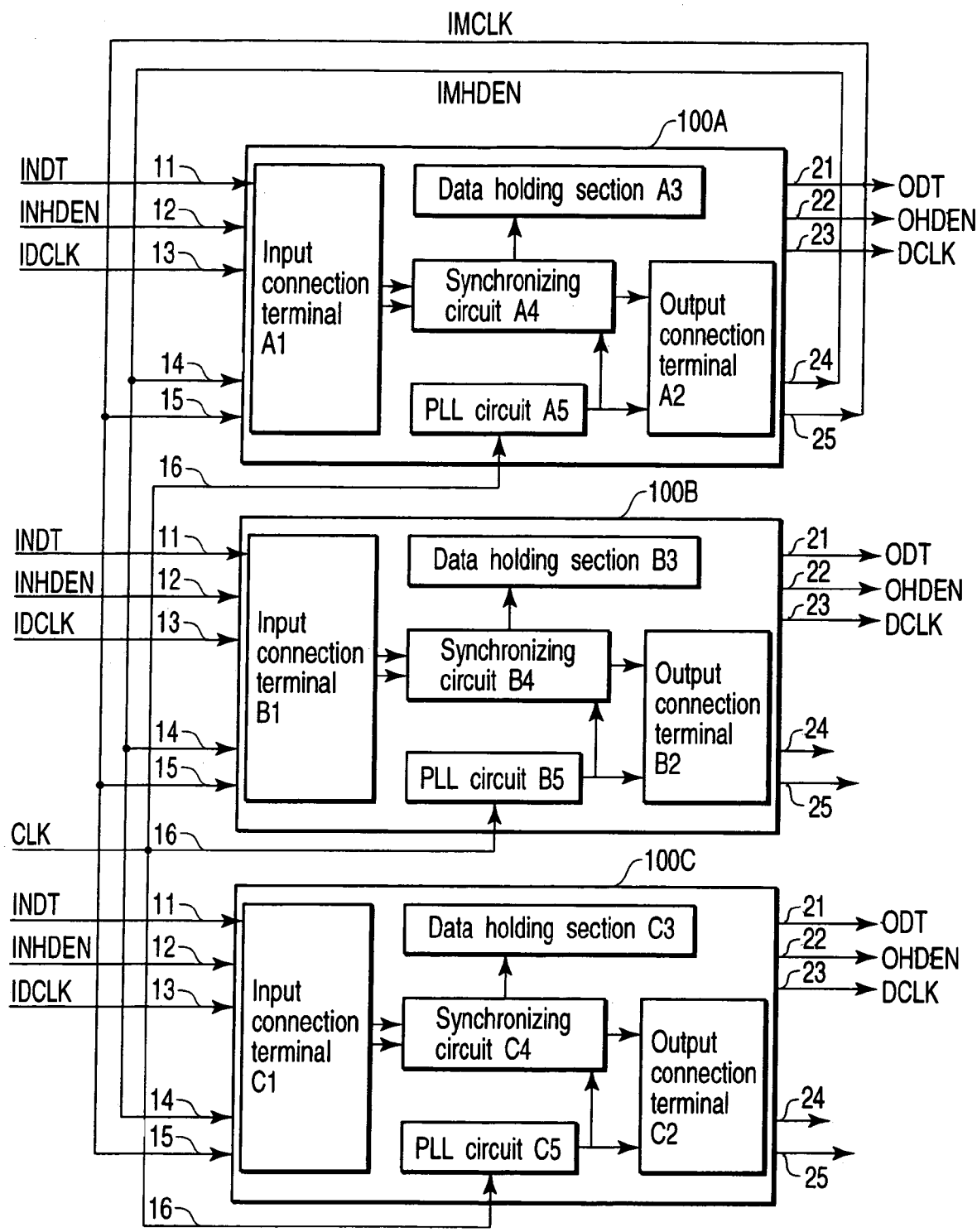
FIG. 1 is a diagram to help explain the important part of the configuration of a data processor with the function of synchronizing the output phases of a plurality of data according to an embodiment of the present invention.

FIG. 1 is a diagram to help explain the important part of the configuration of a data processor according to the present invention. Numerals 100A, 100B, and 100C, which each indicate an image data processing block, have the same internal configuration and are made up of IC circuitry.

Input image data (INDT) is supplied to each input terminal 11. An input image data enable signal (INHDEN) indicating the effective period of input image data (INDT) is supplied to each input terminal 12. In addition, an input transfer clock (IDCLK) synchronized with the input image data is supplied to each input terminal 13. A reference clock (CLK) is supplied to each input terminal 16.

The clock (CLK) is supplied to phase-locked loop (PLL) circuits A5, B5, C5. Each of the PLL circuits A5, B5, C5 generates a clock whose frequency is, for example, eight times that of the clock (CLK), in synchronization with the clock (CLK).

Data holding sections A3, B3, C3 for synchronizing the output image data (ODT) with one another are provided in the image data processing blocks 100A, 100B, 100C, respectively. Moreover, the image data processing blocks 100A, 100B, 100C are provided with terminals A1, A2, B1, C1. The synchronizing output of the image data processing block 100A acting as a master is connected to the input sections of the image data processing blocks 100B, 100C acting as slaves. In addition, synchronizing circuits A4, B4, C4 for synchronizing the output image data are provided in the image data processing blocks 100A, 100B, 100C.

The image data processing blocks 100A, 100B, 100C process the input image data on the basis of the internal clock generated at the PLL circuits A5, B5, C5, respectively. A data processing section is included in each of the data holding sections A3, B3, C3. Each of the data holding sections A3, B3, C3 includes a ring buffer. Even when the image data input to the image data processing blocks 100A, 100B, 100C are asynchronous, a shift in synchronization is absorbed by the buffering. As a result, the data output from the image data processing blocks 100A, 100B, 100C are output in synchronization with one another.

Synchronizing circuits A4, B4, C4 are provided for synchronization. Using the internal clocks, the synchronizing circuits A4, B4, C4 store data into the ring buffers of the data holding sections A3, B3, C3, respectively. However, when carrying out a data read operation, they read the data in synchronization with the image data enable signal and image read clock from the master. As a result, the blocks on the slave side are synchronized with the master read data. Although in FIG. 1, the three image data processing blocks 100A, 100B, 100C are shown, the number of image data processing blocks may be larger than three.

For example, in the image processing apparatus including in a copying machine or a printer, the image data processing blocks may be used as data processing sections for processing R, G, B signal systems. Alternatively, they may be used as data processing sections for processing Y, M, C, K signal systems.

Figure 2:
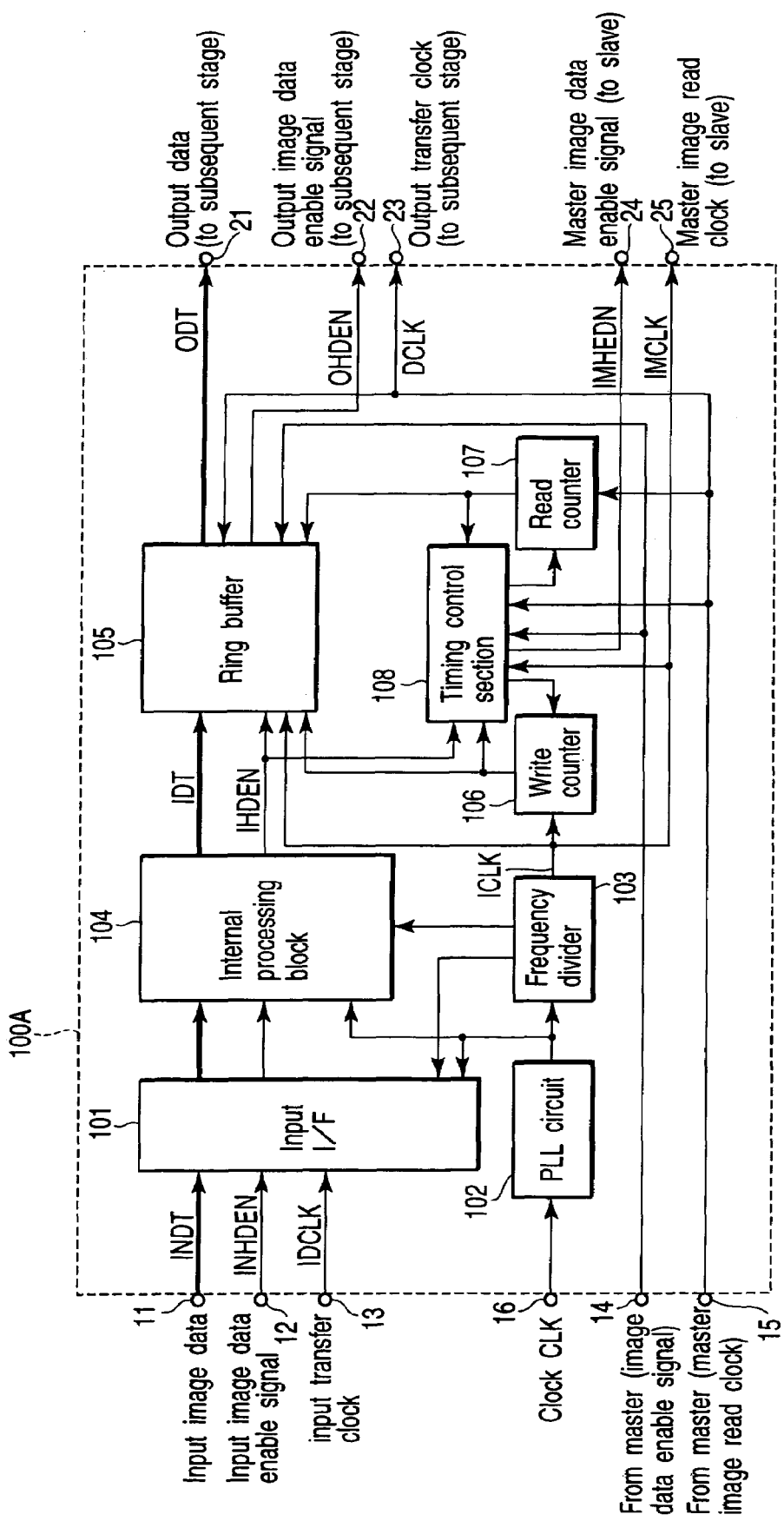
FIG. 2 is a more concrete diagram to help explain the important part of the configuration of the data processor with the function of synchronizing the output phases of a plurality of data according to the embodiment.
Figure 3:
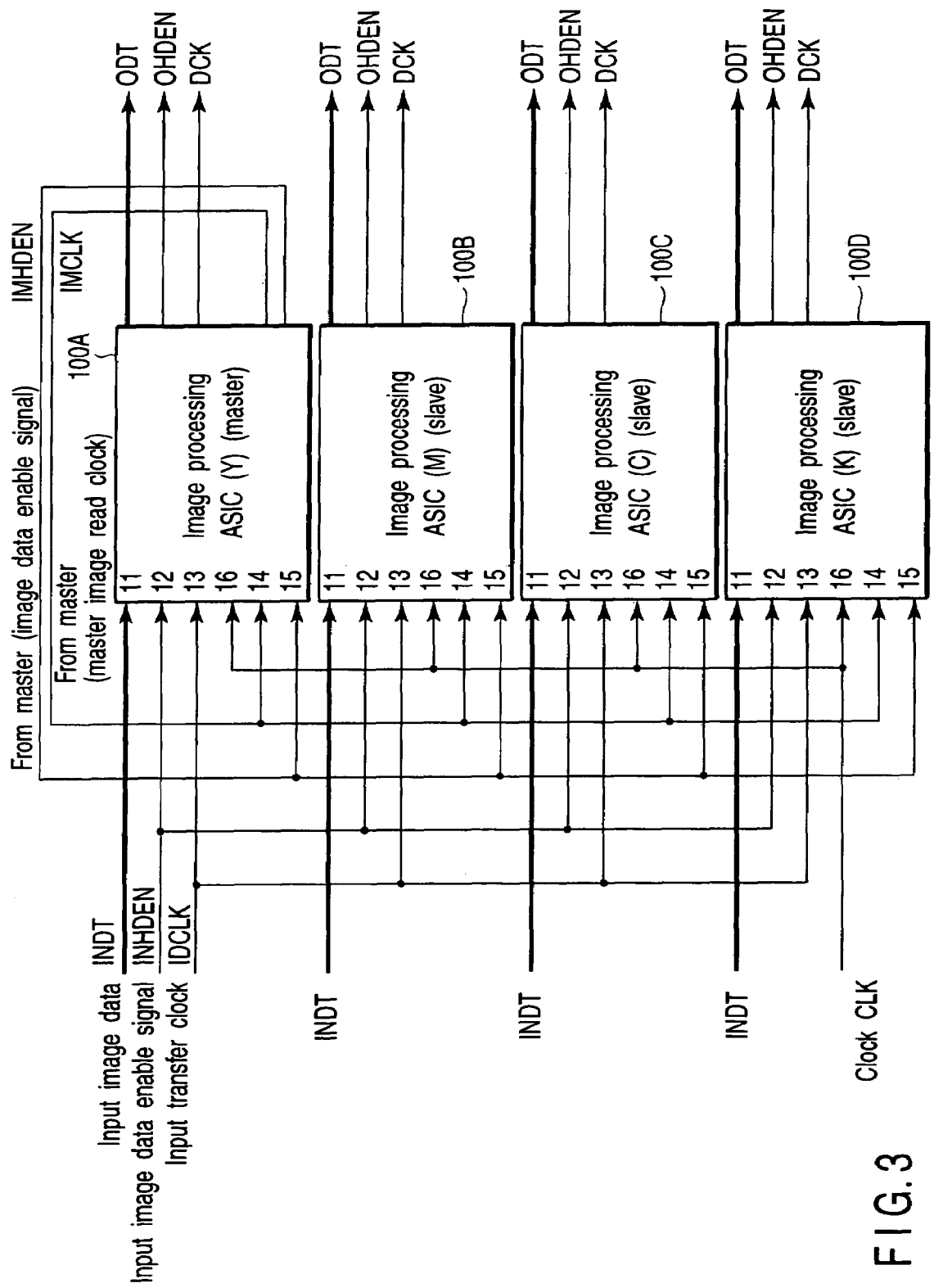
FIG. 3 is a diagram to help explain a configuration when a plurality of data processor shown in FIG. 2 are connected.

Referring to FIGS. 2 and 3, a more detailed explanation will be given. Numeral 100A indicates an image data processing block, which is, for example, made up of IC circuitry. An input image data (INDT) is supplied to the input terminal 11. An input image data enable signal (INHDEN) indicating the effective period of input image data (INDT) is supplied to the input terminal 12. In addition, an input transfer clock (IDCLK) synchronized with the input image data is supplied to the input terminal 13. A reference clock (CLK) is supplied to the input terminal 16.

When the image data processing block 100A is used as a slave, a master image data enable signal is input to the input terminal 14 and a master image read clock is input to the input terminal 15. Even when the image data processing block 100A is used as a master, the input terminals 14, 15 are used.

The clock (CLK) is supplied to a phase-locked loop (PLL) circuit 102. The PLL circuit 102 generates a clock whose frequency is, for example, eight times that of the clock (CLK), in phase synchronization with the clock (CLK).

When the input image data enable signal (INHDEN) goes low (or high), an input interface (I/F) 101 takes in the input image data (INDT) in synchronization with the input transfer clock (IDCLK). The data loaded into the input interface 101 is taken out in synchronization with the clock from the PLL circuit 102 and is input to an internal processing block 104. At this time, the clock from the PLL circuit 102 may be frequency-divided through a frequency divider.

The internal processing block 104 executes a color conversion process, a foundation process, a frequency conversion process, and the like in synchronization with the internal clock (ICLK) generated at the PLL circuit 102 and frequency divider 103. The output image data (IDT) from the internal processing block 104 is input to a ring buffer 105. The image data enable signal (IHDEN) from the internal processing block 104 is also supplied to the ring buffer 105.

On the other hand, the internal clock (ICLK), the frequency-divided output of the frequency divider 103, is not only supplied to a write counter 106, the ring buffer 105, and a timing control circuit 108 but also output as a master image read clock (IMCLK) at an output terminal 25. The write counter 106 counts internal clocks (ICLK) and supplies a write pulse to the ring buffer 105. The count of the write counter 106 is grasped by the timing control section 108. The timing control section 108 generates a reset signal (WCNTRO) to the write counter 106. When the write counter 106 has counted a specific value, the timing control section 108 outputs a write end flag (WEFLGO).

According to the count of the write counter 106, a write address in the ring buffer 105 is specified and the image data (IDT) is written at the specified address. The image data accumulated in the ring buffer 105 is read according to the address specified by the read counter 107. The read-out image data (ODT) is conducted to an output terminal 21, which supplies the image data to a subsequent stage (not shown).

When the image data processing block 100A is used as a slave, the read counter 107 counts the image read clocks from the master supplied to the input terminal 15. Moreover, when the image data processing block 100A is used as a slave, the timing control circuit 108 generates a read counter control signal (RCNTC) on the basis of the image data enable signal from the master and resets the read counter 107 and sets its counting period. The read counter 107 specifies a read address for the ring buffer 105. The read-out output image data (ODT) is output at the output terminal 21. In addition, the ring buffer 105 generates an output image data enable signal (OHDEN) indicating the effective period of the output image data (ODT) and outputs the signal at an output terminal 22. Moreover, a clock which drives the read side of each of the read counter 107 and ring buffer 105 is output as an output transfer clock (DCLK) at an output terminal 23.

The image data processing block 100A further has an output terminal 24 and an output terminal 25. The output terminals 24, 25 are used when the image data processing block 100A is used as a master, and are not used when the processing block 100A is used as a slave.

When the image data processing block 100A is used as a master, the timing control section 108 outputs a master image data enable signal (IMHEDN) at the output terminal 24. At the output terminal 25, an internal clock (ICLK) is output as a master image read clock (IMCLK).

In FIG. 3, there are provided a plurality of circuits each similar to the image data processing block 100A and these circuits are connected to one another so as to meet a master-slave relationship. The input image data INDTA, INDTB, INDTC, INDTD are input to the image data processing block 100A, image data processing block 100B, image data processing block 100C, and image data processing block 100D, respectively. For example, the image data processing block 100A is used for yellow signal processing, the image data processing block 100B is used for magenta signal processing, the image data processing block 100C is used for cyan signal processing, and the image data processing block 100D is used for black signal processing. Then, the image data processing block 100A is used as a master and the other image data processing blocks 100B, 100C, 100D are used as slaves.

To do this, the image data enable signal (IMHDEN) of the image data processing block 100A is supplied to the input terminal 15 of each of the blocks 100B, 100C, 100D acting as slaves. In addition, the image data enable signal is also supplied to the input terminal 15 of the image data processing block 100A itself. Moreover, the master read clock (IMCLK) of the image data processing block 110A is supplied to the input terminal 14 of each of the blocks 100B, 100C, 100D acting as slaves. In addition, the master read clock is also supplied to the input terminal 14 of the image data processing block 100A itself.

With the above configuration, the image data read from the image data processing blocks 100B, 100C, 100D serving as slaves are synchronized with the master image read clock (IMCLK) and master image data enable signal (IMHEDN) of the image data processing block 100A acting as a master.

Even if the phases of the input image data (INDTB), (INDTC), (INDTD) input to the respective image data processing blocks 100B, 100C, 100D have shifted from that of the input image data (INDTA) input to the image data processing block 100A acting as a master, the shifts are absorbed by the ring buffers in the corresponding blocks. As a result, the image data read from the image data processing blocks 100B, 100C, 100D are synchronized with the master image read clock (IMCLK) and master image data enable signal (IMHEDN) of the image data processing block 100A.

Figure 4A:
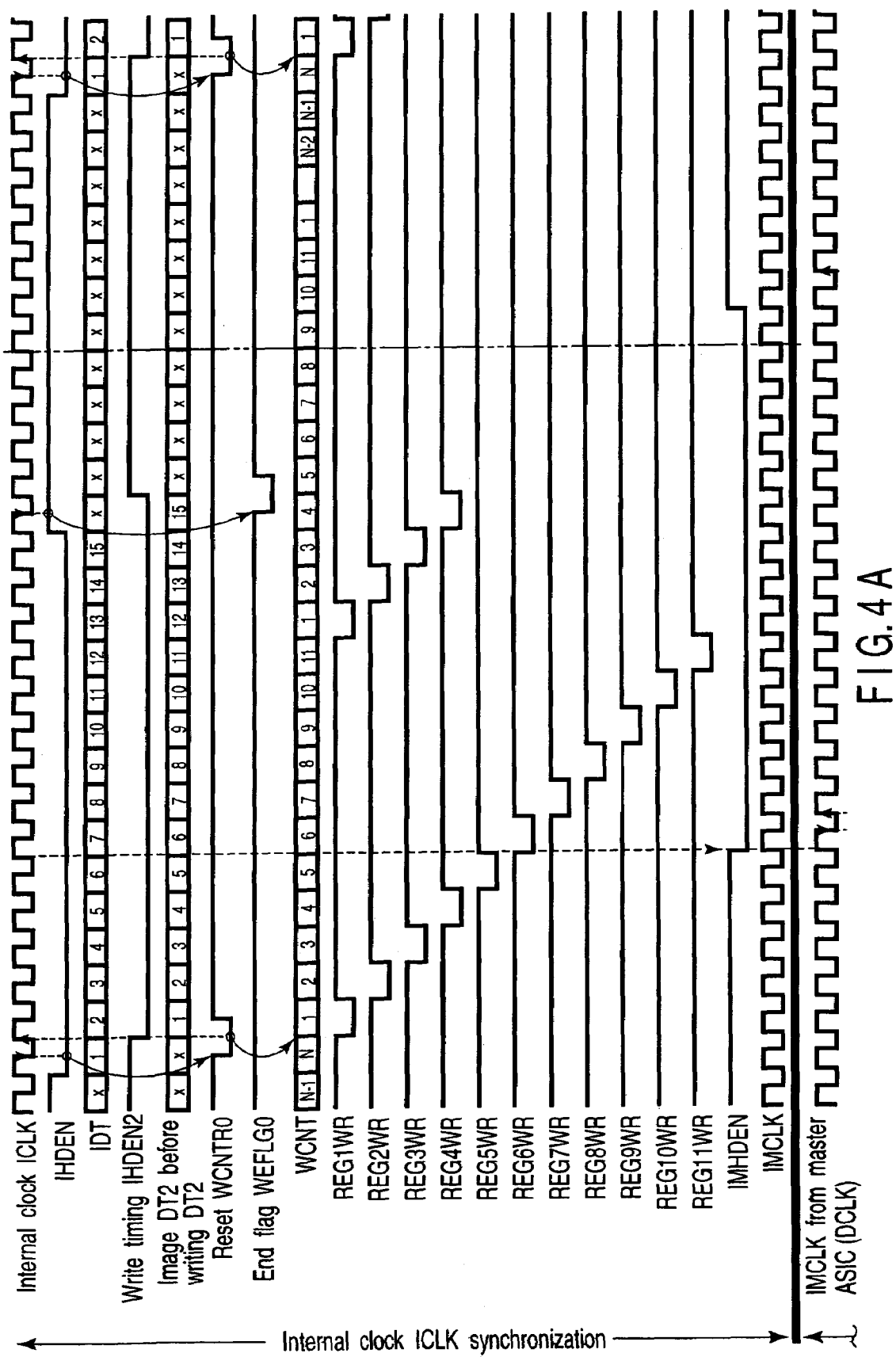
FIGS. 4A and 4B are timing charts to help explain the operations of the circuits shown in FIGS. 2 and 3.
Figure 4B:
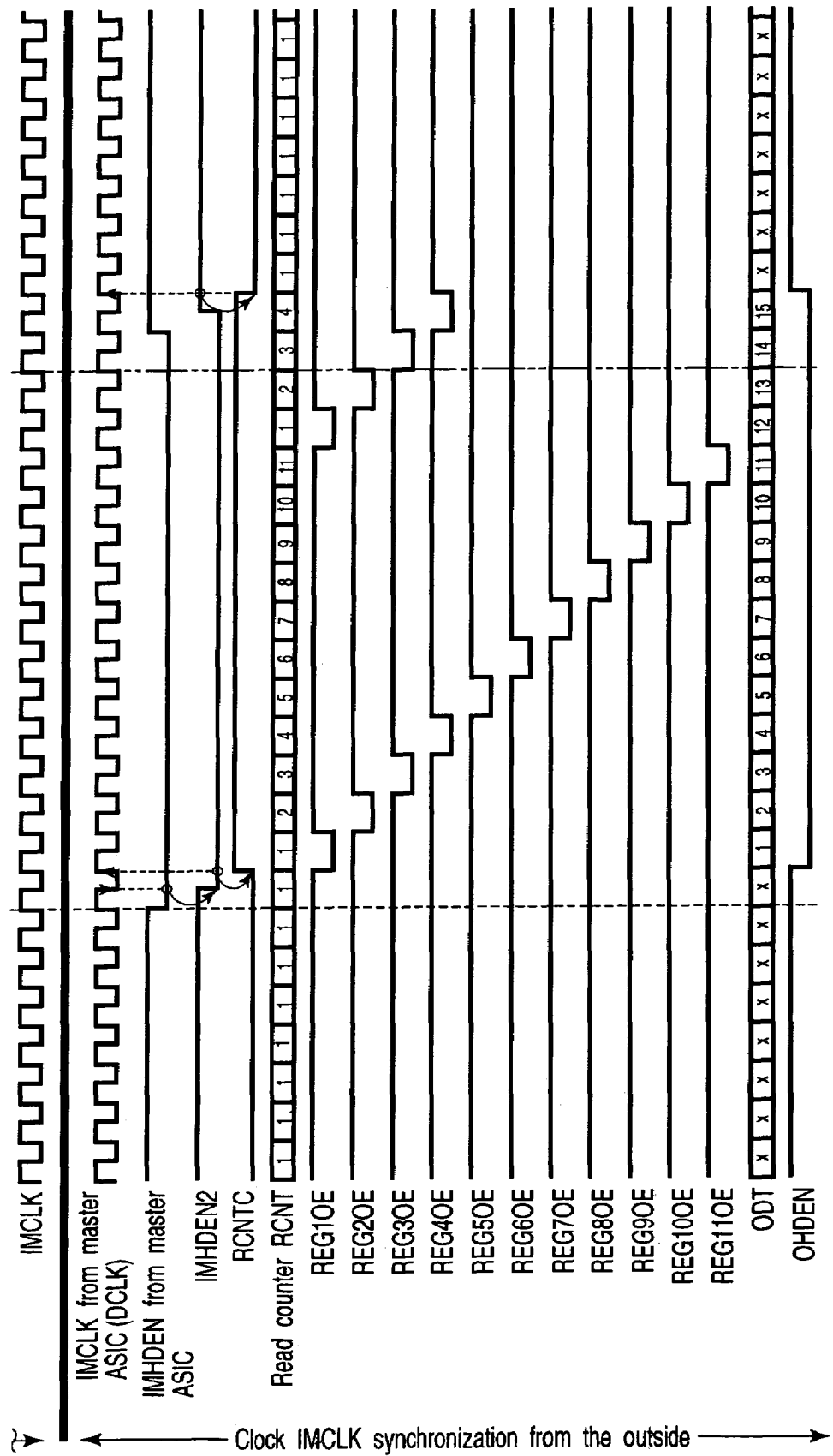
Figure 5A:
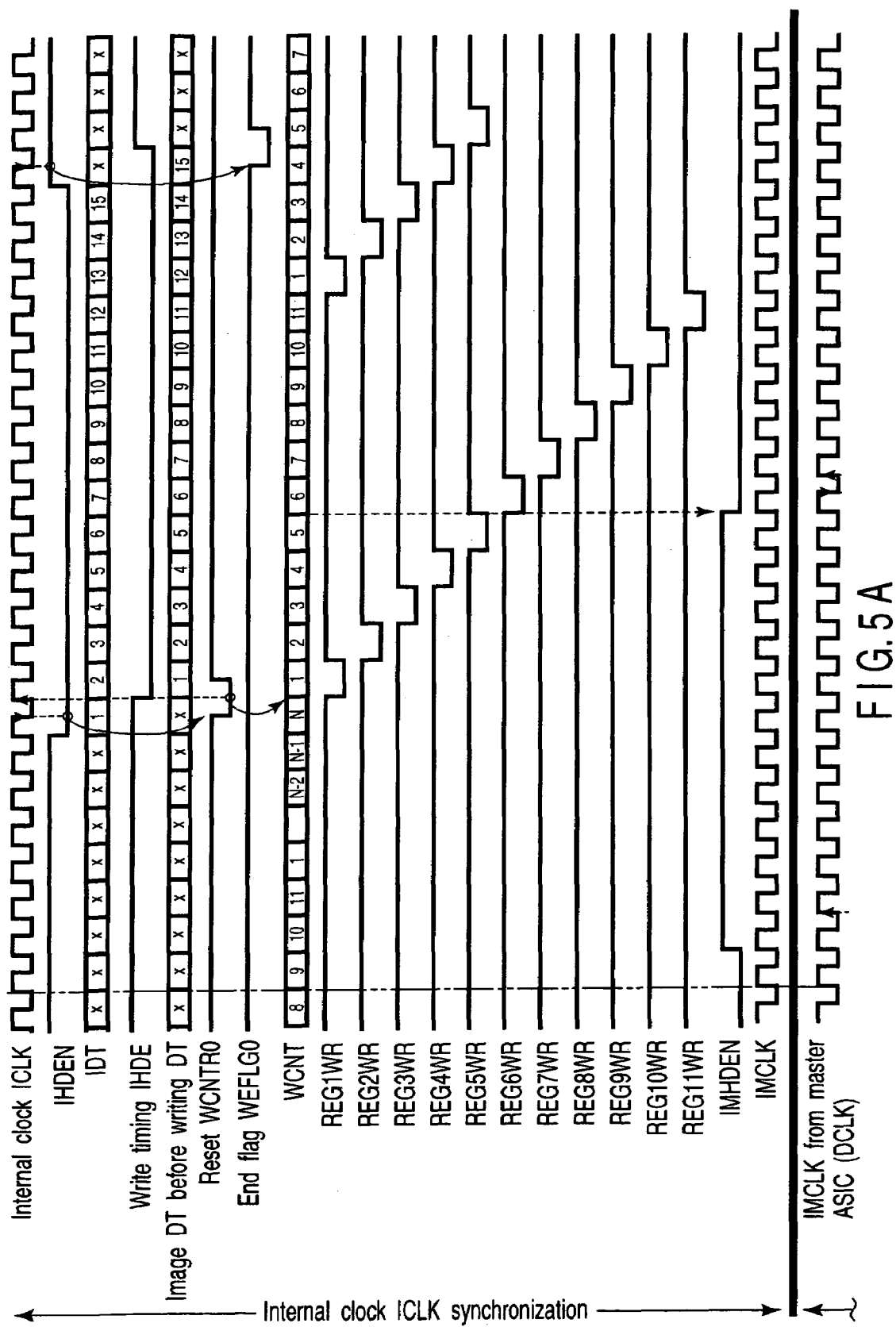
FIGS. 5A and 5B are timing charts to help explain the operations of the circuits shown in FIGS. 2 and 3, following FIGS. 4A and 4B.
Figure 5B:
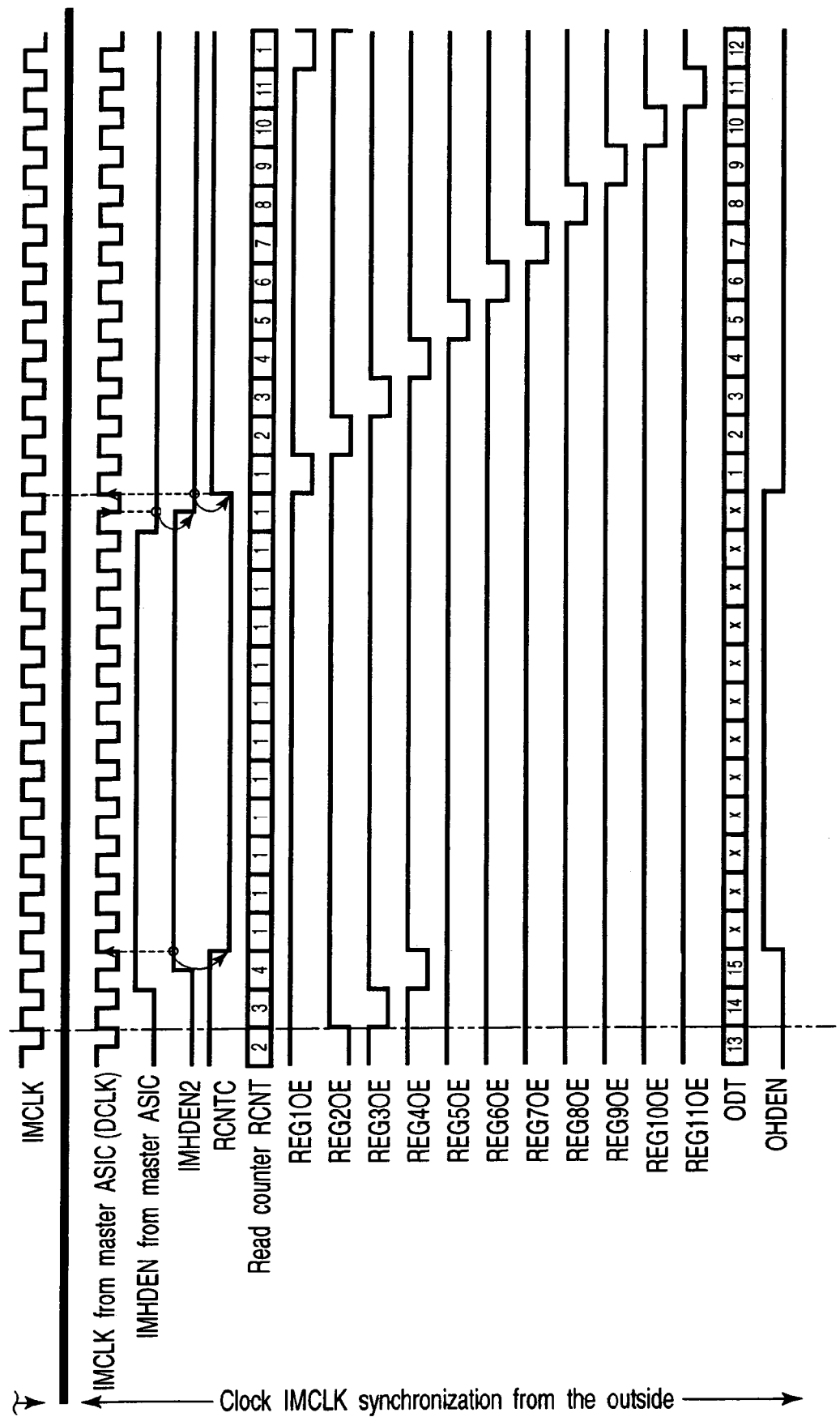

FIGS. 4A and 4B and FIGS. 5A and 5B are timing charts to help explain the operation of the apparatus of the present invention. FIGS. 5A and 5B follow FIGS. 4A and 4B in the direction of time axis. FIGS. 4A and 4B show an internal clock (ICLK) used in the write counter 106 and the image data (IDT) and an image data enable signal (IHDEN) supplied to the ring buffer 105. After the image data enable signal (IHDEN) goes low, the timing control circuit 106 generates a reset signal (WCNTRO) (at the low level) to the write counter 106 at the falling edge of the internal clock (ICLK). When the reset signal (WCNTRO) is at the low level, a ring buffer write timing signal (IHDEN2) is generated at the rising edge of the internal clock (ICLK).

As a result, in the ring buffer, the image data (DT2) (one clock delayed from the input image data) is written in synchronization with the internal clock (ICKL). FIGS. 4A and 4B and FIGS. 5A and 5B show image data 1 to 15. In addition, the counts (WCNY) 1 to 15 of the write counter 106 are shown so as to correspond to the image data 1 to 15. REG1WR to REGG11WR are write timing pulses which can be output from the write counter 106.

A write end flag (WEFLGO) is output from the timing signal control section 108 when, for example, the count has reached 15.

As described above, the image data (IDT) subjected to image processing is effective during the L (low) period of the internal image data enable signal (IHDEN2). The image data (IDT) is synchronized with the corresponding internal clock (ICLK) so as to be written into the ring buffer 105. In addition, the L (low level) of the internal image data enable signal (IHDEN2) is detected, making the write counter reset signal (WCNTRO) L (low), which sets "1" in the write count (WCNT).

Not only does the write counter 106 further count up in synchronization with the internal clock (ICLK), but also the image data is written in the addresses in the ring buffer represented sequentially by the count. In the image data processing block acting as the master, when the count (WCNT) of the write counter 106 has reached "5," the read image data enable signal (IMHDEN) is output to the image data processing blocks 100B, 100C, 100D for the respective colors. While in the example, the read image data enable signal (IMHDEN) is output when the count (WCNT) of the write counter 108 has reached "5," the output timing may be varied according to the situation.

When the write counter 106 has counted up to 11, the number of stages of the ring buffer 105, it returns to 1 and counts up repeatedly. In addition, not only the read image data enable signal (IMHDEN) from the master image data processing block 100A but also the read clock (IMCLK) is output constantly. In this way, the image data is written into the ring buffer sequentially. When the internal image data enable signal (IHDEN) goes high, making the write end flag WEFLGO low, which completes the write operation.

In the above explanation, the process of writing the image data into the ring buffer 105 has been described. Next, the process of reading the image data from the ring buffer 105 will be described.

When an image data enable signal (IMDHN) has arrived at the input terminal 14, the timing control section 108 generates a read enable signal (IMHDN2) in synchronization with the falling edge of a clock (IMCLK). Using the read enable signal (IMHDN2), a read counter control signal (RCNTC) is generated at the rising edge of the next clock. The read counter control signal (RCNTC) resets the read counter 107, which changes the read address for the ring buffer 105 from 1 to 11. The read counter control signal (RCNTC) can limit the count period of the read counter 107. It can regulate the count-up operation when several stages of the ring buffers have been counted.

Now, it is assumed that the image data processing block is used as a slave and that, as described above, the image data enable signal (IMDHEN) is input when the master write counter has counted up to 5. This gives timing charts as shown in FIGS. 4A and 4B and FIGS. 5A and 5B.

Even if the internal image data (IDT) is delayed five clocks from the preceding master for some reason, this delay can be absorbed since the read counter 107 is delayed in starting to count. That is, since the start of reading on the master side is also delayed for five clocks, the output data from the master and that of the slave are eventually synchronized with each other. Conversely, even if the internal image data (IDT) leads five clocks from the preceding master for some reason, the output data from the master and that of the slave are eventually synchronized with each other since the read counter 107 on the master side starts to count in synchronization with that on the slave side.

In this embodiment, when the write counter 106 on the master side has counted five addresses, a master image data enable signal (IMHDN) is output. The invention is not limited to this. For instance, the master image data enable signal (IMHDN) may be output with a delay of up to several stages of the ring buffer 106.

As described above, in the master image processing integrated circuit (ASIC) and slave image processing integrated circuit, the written image data is read on the basis of the read image data enable signal (IMHDEN) and read clock (IMCLK) output from the master image processing integrated circuit (ASIC). In addition, the input read image data enable signal IMHDEN is synchronized with the read clock IMCLK, thereby generating a read flag signal and read counter reset signal (or read counter control signal). Moreover, the "1" is set in the read counter, thereby starting to read.

At this time, the write side has written into the sixth buffer, with five stages of buffer being secured before and after the buffer. As a result, each image processing integrated circuit (ASIC) can absorb a shift in the ring buffer, provided that the shift is equal to or less than five clocks.

When reading is started, the read counter counts up in synchronization with the output transfer clock DCLK from the master image data processing integrated circuit (ASIC) and reads the stored image data into the buffer sequentially specified by the count. At this time, what are output to the outside world by each image processing integrated circuit (ASIC) are the read-out output image data ODT and the output image data enable signal OHDEN and output transfer clock DCLK output from the master image processing integrated circuit (ASIC) acting as the master.

When the count has reached 11, the number of stages of the ring buffer, it returns to 1 and is incremented in units of one repeatedly. In this way, the image data stored in the ring buffer is read out sequentially. The "H" (high level) of IMDDEN2 obtained by synchronizing the read image data enable signal IMHDEN with the falling clock is detected on the basis of the read clock IMCLK output from the master image processing ASIC, which completes the reading.

As described above, each image processing integrated circuit (ASIC) writes the image data into the ring buffer in an asynchronous manner. The written image data is read from the ring buffer using the read image data enable signal (IMHDEN) and read clock (IMCLK) supplied from the image processing integrated circuit (ASIC) serving as the master, which enables the outputs of the individual image processing integrated circuits (ASIC) to be synchronized with one another using a minimum necessary memory. The above-described ring buffer control method is one example. If there is a mechanism which has as many counts as the number of buffers and is capable of storing image data circularly, a similar function can be realized.

Since the image processing integrated circuit (ASIC) contains a PLL oscillator for speeding up and has a larger-size image processing circuit for higher-quality pictures, it may be divided into units for individual colors. In this case, too, image data of individual colors can be synchronized with one another with a minimum memory increase.

Furthermore, the number of stages of the ring buffer can be determined easily, taking into account the performance of the PLL oscillator, the amount of internal delay in the image processing integrated circuit (ASIC), and the amount of delay on the substrate.

While in the above explanation, the image data processing section has been described, the present invention is not limited to image data processing and may be applied effectively to a case where data about other objects are processed at high speed.

As for a method of using the internal processing block 104 provided in each of the image data processing blocks 100B, 100C, 100D, various methods are possible. For instance, in the process of computing image data, there are an image feature extracting process, a foundation process, a color conversion process, and a character recognition process. Moreover, there are an image data gradation process, a frequency conversion process, and an area control process. These various data processes may be assigned to the image data processing blocks 100B, 100C, 100D, which carry out the assigned processes.

This invention is not limited to the above embodiment and may be practiced or embodied in still other ways without departing from the spirit or essential character thereof. In addition, various inventions may be configured by suitably combining a plurality of component elements disclosed in the embodiment. For instance, some component elements may be eliminated from all of the component elements shown in the embodiment. Furthermore, the component elements related to different embodiments may be combined suitably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processor with the function of synchronizing a plurality of chips, comprising:
    a first data processing section which includes
        input connection terminals which take in object data, an object data enable signal (INHDEN) from the outside, and an object read clock (IMCLK) from the outside,
        a data holding section in which the object data is stored on the basis of an internal clock, a synchronizing circuit which reads the object data stored in the data holding section on the basis of the object data enable signal (INHDEN) from the outside and the object read clock (IMCLK) from the outside, and output connection terminals which output to the outside the output object data from the data holding section, the object data enable signal (INHDEN) from the outside, and an internal clock equivalent to the object read clock (IMCLK); and a second data processing section which includes second input connection terminals corresponding to the input connection terminals, a second data holding section corresponding to the data holding section, a second synchronizing circuit corresponding to the synchronizing circuit, and second output terminals corresponding to the output connection terminals, wherein the object data enable signal (INHDEN) and object read clock (IMCLK) from the output connection terminals of the first object processing block are supplied to second input connection terminals.

2. The data processor according to claim 1, wherein each of the first and second object processing sections has a phase lock circuit in it, wherein the frequency of an internal clock obtained from the phase-locked loop circuit is an integral multiple of that of the transfer clock of externally input object data.

3. The data processor according to claim 1, wherein the object data is image data and the first and second data processing sections are blocks which process image data of different colors.

4. A data processor with the function of synchronizing a plurality of chips, comprising:

a first data processing section which includes the elements of:

a phase synchronizing loop circuit which generates an internal clock phase-synchronized with a reference clock externally input, an internal processing block which is driven by the internal clock and processes input data, a ring buffer which stores the processed data from the internal processing block and outputs the processed data stored at a data output terminal, a write counter which is driven by the internal clock and generates a write address in the ring buffer, a read counter which is driven by a read clock from the outside and generates a read address in the ring buffer, a timing control section which manages the count cycles of the write counter and read counter, a master-object data enable signal output terminal which outputs a master-object data enable signal (IMHEDN) generated by the timing control section to the outside a specified period after the write counter starts to generate a write address in the ring buffer, a master-object read clock output terminal which outputs the internal clock as a master-object read clock (IMCLK) to the outside, and a master-object data enable signal input terminal and a master-object read clock input terminal to which the master-object data enable signal (IMHEDN) and master-object read clock (IMCLK) are input, respectively; and a second data processing section configured to comprise the same elements as the first data processing section, wherein the object data enable signal (IMHEDN) and object read clock (IMCLK) from the output connection terminals of the first object processing block are supplied to a master-object data enable signal input terminal and a master-object read clock input terminal of the second data processing section.

5. The data processor according to claim 4, wherein the ring buffer outputs at an output terminal an output object data enable signal which indicates the effective period of the processed data output at the data output terminal by the ring buffer.

6. A data processor with the function of synchronizing a plurality of chips, comprising:

a first data processing section which includes a first phase synchronizing loop circuit which generates a first internal clock phase-synchronized with a reference clock externally input, a first internal processing block which is driven by the first internal clock and processes first input data, a first ring buffer which stores the processed data from the first internal processing block and outputs the stored processed data at a first data output terminal, a first write counter which is driven by the first internal clock and generates a write address in the first ring buffer, a first read counter which is driven by a first read clock from the outside and generates a read address in the first ring buffer, a first timing control section which manages the count cycles of the first write counter and first read counter, a first master-object data enable signal output terminal which outputs a first master-object data enable signal (IMHEDN) generated by the timing control section to the outside a specific period after the first write counter starts to generate a write address in the first ring buffer, a first master-object read clock output terminal which outputs the first internal clock as a master-object read clock (IMCLK) to the outside, and a first master-object data enable signal input terminal and a first master-object read clock input terminal to which the first master-object data enable signal (IMHEDN) and master-object read clock (IMCLK) are input respectively, and and a first object enable signal output terminal at which a first output object data enable signal (OHDEN) is output from the first ring buffer; and a second data processing section which includes a second phase synchronizing loop circuit which generates a second internal clock phase-synchronized with a reference clock externally input, a second internal processing block which is driven by the second internal clock and processes second input data, a second ring buffer which stores the processed data from the second internal processing block and outputs the stored processed data at a second data output terminal, a second write counter which is driven by the second internal clock and generates a write address in the second ring buffer, a second read counter which is driven by a first read clock from the outside and generates a read address in the ring buffer, a second timing control section which manages the count cycles of the second write counter and second read counter, and a second master-object data enable signal input terminal and a second master-object read clock input terminal to which the first master-object data enable signal (IMHEDN) and master-object read clock (IMCLK) are input respectively, and a second output object data enable signal output terminal which outputs a second output object data enable signal (OHDEN) output from the ring buffer to the outside a specific period after the second write counter starts to generate a write address in the second ring buffer.

7. The data processor according to claim 6, wherein the first and second object data are image data and the first and second data processing sections process image data of different colors.

8. The data processor according to claim 6, wherein the first and second object data are image data of a combination of yellow (Y) and magenta (M), image data of a combination of yellow (Y) and cyan (C), or image data of a combination of yellow (Y) and black (K).

9. The data processor according to claim 8, wherein the first and second internal processing blocks process image data arithmetically.

* * * * *